United States Patent

Huang et al.

[11] Patent Number: 5,634,161
[45] Date of Patent: May 27, 1997

[54] SPROCKET MECHANISM FOR CAMERAS

[75] Inventors: Yeou-Fu Huang, Taichung; Jong-Shing Lin, Feng Yuan City, both of Taiwan

[73] Assignee: Sinpo Optical Co., Ltd., Taichung County, Taiwan

[21] Appl. No.: 626,376

[22] Filed: Apr. 2, 1996

Related U.S. Application Data

[63] Continuation-in-part of Ser. No. 525,020, Sep. 8, 1995, Pat. No. 5,585,877.
[51] Int. Cl.$^6$ ............................................. G03B 1/00
[52] U.S. Cl. ............................. 396/398; 396/411
[58] Field of Search ............................ 396/395, 397, 396/398, 411

[56] References Cited

U.S. PATENT DOCUMENTS 5,410,380  4/1995  Kawamura et al. .................. 396/398

*Primary Examiner*—David M. Gray
*Attorney, Agent, or Firm*—Bacon & Thomas

[57] ABSTRACT

A sprocket mechanism for cameras includes a sprocket consisted of a body and a raised annular portion, a positioning plate fitted onto the sprocket, and an electrical switch located near the positioning plate. The sprocket body has two opposite pairs of pawls spaced suitably apart, and the raised annular portion has two notches provided at predetermined positions. When the sprocket rotates through 180 degrees, the electrical switch is caused to be on or off. A motor is caused to stop after an electrical signal is detected. At the same time, it can be determined that a frame of the film has been advanced and precisely positioned, and a counter is provided to display the number of frames advanced.

3 Claims, 3 Drawing Sheets

SPROCKET MECHANISM FOR CAMERAS

CROSS REFERENCE TO RELATED APPLICATIONS

The present invention is a continuation-in-part of U.S. patent application Ser. No. 08/525,020 filed Sep. 8, 1995, now U.S. Pat. No. 5,585,877.

BACKGROUND OF THE INVENTION (a) Field of the Invention

The present invention relates generally to a camera, and more particularly to a sprocket mechanism for cameras which utilizes rotation of a sprocket to obtain an electrical detection signal for effectively determining the state of advancement and positioning of the frames of a film roll as well as displaying the number of advanced frames.

(b) Description of the Prior Art

The parent patent application of the present invention is directed to an improvement on the sprocket mechanism for facilitating advancement of film rolls of a new film system. In the parent application, the sprocket mechanism comprises a sprocket having a body provided with two pawls spaced apart from each other a predetermined distance at a periphery thereof, a first gear located at an upper side thereof and provided with a notch at a suitable position at its periphery, a transmission wheel forming a second gear at the upper side of the sprocket, the second gear having a shaft extending from a bottom side thereof for fitting and freely displacing in a central hole of the first gear, the shaft being fitted with a stop element having a vertical section at a rear end thereof, the vertical section being retained in the notch of the first gear, thereby allowing the sprocket, transmission wheel and the stop element to synchronously rotate when the pawls of the sprocket engage the positioning holes of the film; after the sprocket has rotated through a determined angle, the pawls will contact the film so that the stop element will absorb the rotational speed from the transmission wheel, achieving precise advancement of a single frame of film. The present invention is directed to enhancing the effectiveness of the sprocket mechanism disclosed in the parent application.

SUMMARY OF THE INVENTION

According to an aspect of the present invention, the sprocket mechanism comprises an electrical switch disposed near a positioning plate fitted onto a sprocket, the sprocket having a body provided with two opposite pairs of pawls spaced suitably apart and a raised annular portion having two notches at predetermined positions, the electrical switch being turned on or off with a 180 degree rotation of the sprocket, the detected electrical signal is used to control a motor to stop and determine the positioning of a frame of film while a counter is used to indicate the number of advanced frames of film.

According to another aspect of the present invention, the sprocket mechanism further comprises a microprocessor for controlling advancement of the film such that the film is advanced to the second frame initially and then rewound to the leader (zero frame) before being advanced to the first frame. Such an arrangement prevents faulty advancement, which may affect the positioning of the first frame of film.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
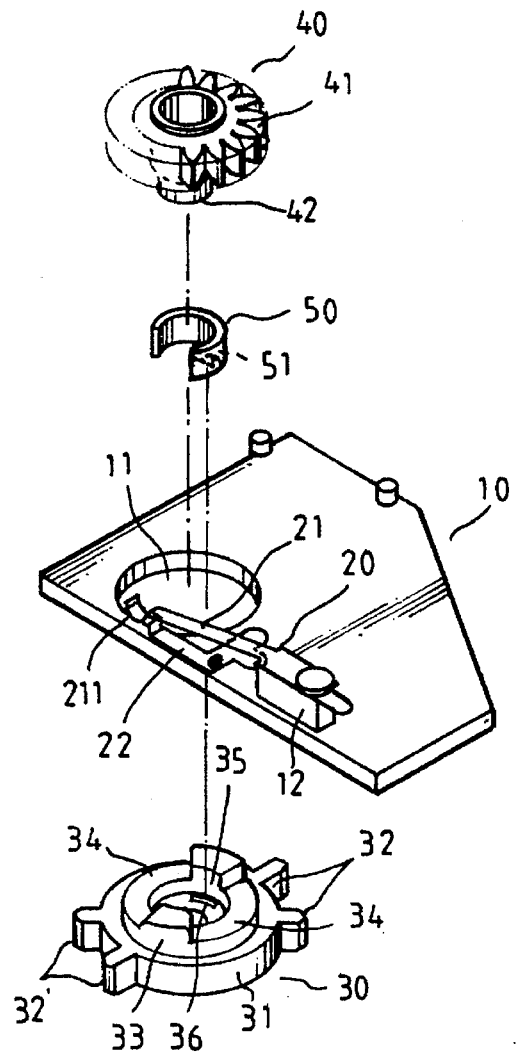
FIG. 1 is an elvational exploded view of a preferred embodiment of the sprocket mechanism of the present invention.
Figure 2:
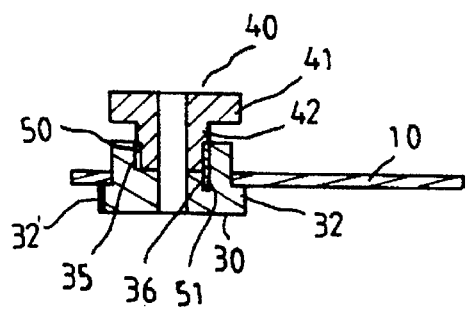
FIG. 2 is a sectional view of the preferred embodiment of the present invention.

With reference to FIGS. 1 and 2, a preferred embodiment of the present invention essentially comprises a positioning plate 10, a sprocket 30, a transmission wheel 40 and a resilient piece 50.

The positioning plate 10 is disposed on a housing of the camera and has a faceplate provided with a through hole 11. Adjacent to the through hole 11 is located an electrical switch 20 consisting of an upper spring strip 21 and a lower spring strip 22. The first spring strip 21 is locked on a column 12 of the positioning plate 10, with a contact portion 211 at a front end thereof projecting above the periphery of the through hole 11, while the second spring strip 22, having a size slightly smaller than that of the first spring strip 21, is fixedly disposed at the periphery of the through hole 11 so that it corresponds to the first spring strip 21 above.

The sprocket 30 located below the positioning plate 10 projects through the through hole 11. The sprocket 30 has a body 31 which is circumferentially provided with two pairs of pawls 32, 32' spaced a suitable distance apart and a raised annular portion 33 on an upper side of the body 31 provided with two notches 34 at predetermined positions. The sprocket 30 further has a central annular hole 35 provided with a slot 36 at a periphery thereof.

The transmission wheel 40 is provided with a gear 41 at an upper side thereof for engaging a transmission gear set of a motor (not shown). The gear 41 has a shaft 42 extending from a bottom side thereof. The shaft 42 has a diameter slightly smaller than the central annular hole 35 of the sprocket 30 so that the shaft 42 may have some space for displacement when fitted into the central annular hole 35.

The resilient piece 50 is a split-end annular structure. It is fitted onto the shaft 42 of the transmission wheel 40. A bottom side of the resilient piece 50 is provided with a projecting portion 51 which may be firmly inserted into the slot 36 of the sprocket 30.

Figure 3:
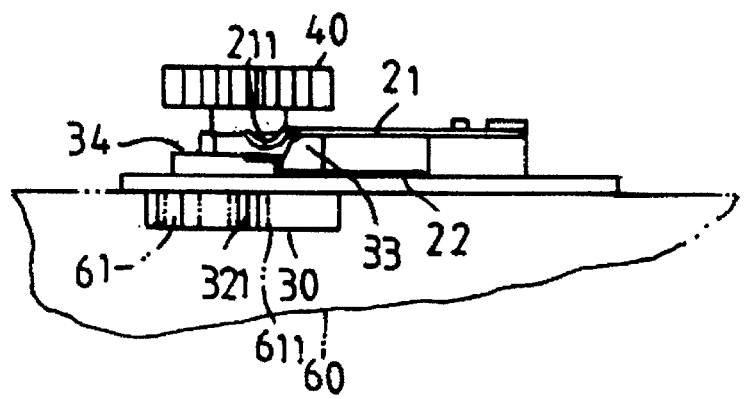
FIG. 3 is a side view of the preferred embodiment of the present invention.
Figure 4:
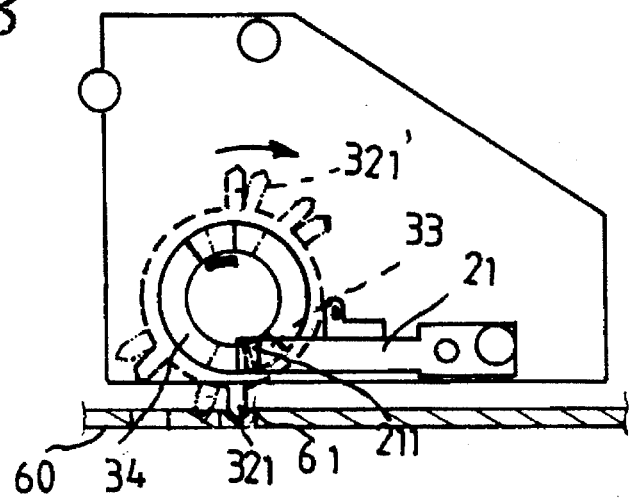
FIG. 4 is a side view illustrating operation of the sprocket mechanism of the present invention.
Figure 5:
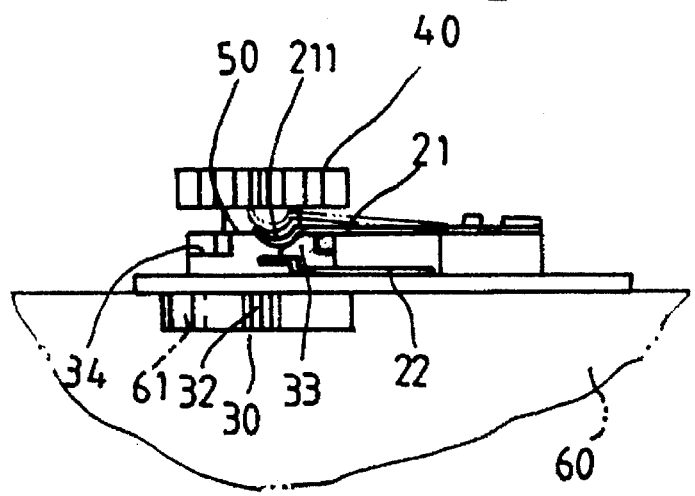
FIG. 5 is a top view illustrating operation of the sprocket mechanism of the present invention.
Figure 6:
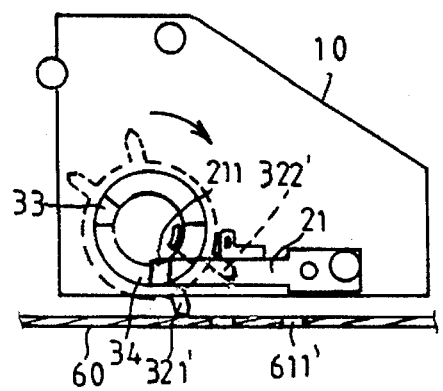
FIG. 6 is another side view illustrating operation of the sprocket mechanism of the present invention.
Figure 7:
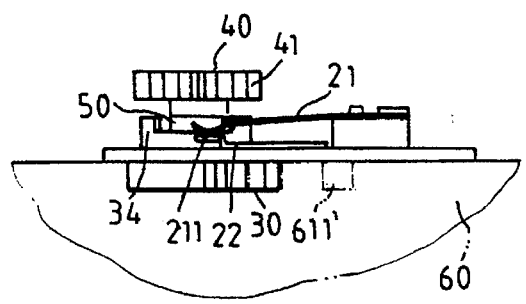
FIG. 7 is another top view illustrating operation of the sprocket mechanism of the present invention.
Figure 8:
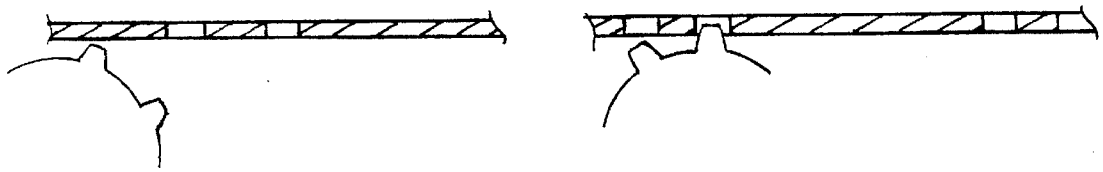
FIG. 8 is a schematic view illustrating the normal position of the sprocket at the initial stage of film advancement.
Figure 9:
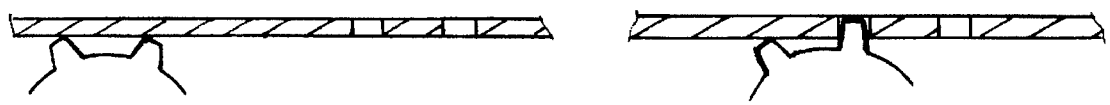
FIG. 9 is a schematic view illustrating the sprocket not in normal position at the initial stage of film advancement.

The components of the preferred embodiment of the present invention as well as their relative relationship have been described as above. With reference to FIG. 3 in which the above-described components are assembled and the camera, with a film role installed and advanced, is in a ready state, a rear positioning hole 61 of two contiguous positioning holes of a film 60 is fitted onto a rear pawl portion 321 of the first pair of pawls 32 respectively, and the contact portion 211 of the upper spring strip 21 of the electrical switch 20 is urged upwardly by the raised annular portion 33 of the sprocket 33 so that the electrical switch 20 is in an "OFF" state. When the film 60 is advanced again, referring to FIGS. 4 and 5, the gear 41 engaging with the transmission gear set of the motor starts rotation. At this point, the sprocket 30, the transmission wheel 40 and the resilient piece 50 synchronously rotate. The sprocket 30, by means of its first pair of pawls 32 catching the positioning holes 61 of the film 60, assists rotation. After the sprocket 30 has displaced through a certain angle, the contact portion 211 of the upper spring strip 21 is relieved from the urging action of the raised annular portion 33 of the sprocket 30 so that it drops and rests at the position of one of the notches 34 so that it is in contact with the lower spring strip 22, as shown in FIGS. 6 and 7. At this point, the electrical switch 20 is ON. Then the sprocket 30 continues to rotate so that a front pawl portion 321' at a position corresponding thereto contacts the file 60. As the sprocket 30, the transmission wheel 40 and the resilient piece 50 are in an interconnected relationship, they move as an entire whole if none of them is subjected to an external force. However, when any one of these components is disturbed by an external force, they will be forced to act separately. When the sprocket 30 is baffled by the film 60 upon contact therewith, the rotational speed transmitted by the gear 41 is absorbed by the resilient piece 50 instead of by the sprocket 30. In other words, the sprocket 30 will stop rotating with the transmission wheel 40 temporarily, while the film 60 is pushed forwardly by the other mechanisms until a rear positioning hole 611' of the next frame of film 60 is fitted onto the rear pawl portion 322', enabling the sprocket to rotate a little forward, so that he contact portion 211 of the upper spring strip 21 is again urged upwardly by the raised annular portion 33 of the sprocket 30. The electrical switch 20 is then Off again and the entire sprocket mechanism is in a ready state. A microprocessor (not shown), detecting the switching of ON and OFF of the electrical switch 20, immediately controls the motor to stop rotation and effectively determines the advancement of a frame, while causing a counter to display the number of frames advanced. Furthermore, when the last frame of the film 60 is being advanced and there is only one positioning hole 611 left on the film 60, the front pawl portion of 321' may fit into the positioning hole 611 while the rear pawl portion 322' is left idle. At this point, the microprocessor, not detecting any signal from the electrical switch 20, immediately stops the motor and causes it to start reverse rotation, so that rewinding takes the place of advancing. On the other hand, in order to ensure that the film 60 is properly positioned at the beginning of film advancement (as shown in FIG. 8), i.e., in order to prevent the sprocket 30 from being not in a normal ready position (as shown in FIG. 9), the microprocessor may be used to control the film 60 such that it is advanced to the second frame and then rewound to the leader (zero frame) before being advanced to the first frame. This will prevent faulty initial film advancement.

In summary, the present invention employs an electrical switch installed adjacent to a positioning plate fitted onto the sprocket and two pairs of pawls spaced suitably apart at the periphery of the body of the sprocket, the sprocket having a raised annular portion provided with two notches, so that the electrical switch may be ON and OFF once with a 180-degree rotation, enabling a microprocessor to detect the switch signal for controlling a motor to stop rotation, determining the advancement of a frame and causing a counter to display the number of frames advanced.

Although the present invention has been illustrated and described with reference to the preferred embodiment thereof, it should be understood that it is in no way limited to the details of such embodiment but is capable of numerous modifications within the scope of the appended claims.

What is claimed is:

1. A sprocket mechanism for cameras, comprising:

a positioning plate mounted on a housing of a camera, said positioning plate having a through hole for receiving a sprocket;

said sprocket, having a central annular hole for accommodating a transmission wheel;

said transmission wheel having a gear at an upper side thereof for engagement with a transmission gear set of a motor; said transmission wheel having a shaft which extends from a bottom side thereof and is sized slightly smaller than that of said central annular hole of said sprocket;

a resilient piece fitted onto said shaft, said resilient piece having a bottom side provided with a projection at one side thereof for insertably fixed onto said sprocket, wherein said sprocket is provided with two pairs of pawls spaced a suitable distance apart from one another and a raised annular portion on an upper side of a body thereof, said raised annular portion having two notches provided at predetermined positions;

and an electrical switch is mounted at a predetermined position adjacent to said positioning plate, said electrical switch consisting of an upper spring strip and a lower spring strip, said upper spring strip having a contact portion at a front end thereof projecting above an upper periphery of said through hole of said positioning plate so that it is in a corresponding relationship to said second spring strip, said contact portion of said upper spring strip being urged upwardly by said body of said sprocket so that said electrical switch is in an OFF state, an electrical signal being detected by a microprocessor for stopping said motor, determining whether a frame has been properly advanced and precisely positioned, and a counter is actuated to display the number of film frames used.

2. A sprocket mechanism as claimed in claim 1, wherein two adjacent pawls of said sprocket are unable to fit into the positioning holes of a film when the film has been advanced to the last frame thereof so that the microprocessor cannot detect the normal signals of said electrical switch and may immediately stop the motor, causing it to start reverse rotation so that the film roll is rewound.

3. A sprocket mechanism as claimed in claim 1, wherein the microprocessor controls the film to be advanced to a second frame at the initial stage of film advancement and rewound to a leader (zero frame) before advancing the film to a first frame, preventing faulty film advancement, which may affect the positioning of the first frame of film.

* * * * *